Aug. 17, 1948.　　　F. J. LINGEL　　　2,447,191
VIBRATING REED FREQUENCY METER
Filed Nov. 19, 1945　　　3 Sheets-Sheet 1

INVENTOR
FREDERICK J. LINGEL
BY Toulmin & Toulmin
ATTORNEYS

Aug. 17, 1948.　　　F. J. LINGEL　　　2,447,191
VIBRATING REED FREQUENCY METER
Filed Nov. 19, 1945　　　3 Sheets-Sheet 2

INVENTOR
FREDERICK J. LINGEL
BY *Toulmin & Toulmin*
ATTORNEYS

Aug. 17, 1948.     F. J. LINGEL     2,447,191
VIBRATING REED FREQUENCY METER
Filed Nov. 19, 1945     3 Sheets-Sheet 3

INVENTOR
FREDERICK J. LINGEL
BY *Toulmin & Toulmin*
ATTORNEYS

Patented Aug. 17, 1948

2,447,191

UNITED STATES PATENT OFFICE 2,447,191

VIBRATING REED FREQUENCY METER

Frederick J. Lingel, Bluffton, Ohio, assignor to The Triplett Electrical Instrument Co., Bluffton, Ohio, a corporation of Ohio Application November 19, 1945, Serial No. 629,607

10 Claims. (Cl. 172—245)

The present invention relates to frequency meters, more particularly to those of the vibrating reed type.

The calibrations and adjustments of vibrating reed frequency meters are sometimes difficult and tedious since they involve adding different weights to the various reeds by using gobs of solder or changing the positions of the reed supports.

The matter of interpolation between unit frequencies is also hard to gauge since the operator not only has to watch carefully the reed which is vibrating at the greatest amplitude, but also the reeds on both sides of the main vibrating reed and to estimate the proportional amount that these adjacent reeds vibrate with respect to the main reed. He thus estimates the fractional unit of frequency to which the meter is responding. The fact that two or possibly three reeds must be observed simultaneously by the operator leads to inaccuracy of measurement unless the operator is highly trained.

The primary object of the invention is to provide an improved frequency meter in which calibrations and adjustments are facilitated. Another object is to provide a frequency meter of the vibrating reed type in which accurate interpolations can be made between unit frequencies by an operator who may not have been specially trained for this purpose.

In carrying out these objects, I employ vibrating reeds of magnetic material and position adjacent thereto a series of independently adjustable permanent magnets which regulate or control the stiffness of movement of the reeds. The position of the magnet with respect to its reed determines in a large measure the frequency to which that reed will respond. Consequently by moving the permanent magnet, accurate calibration of the reed or reeds can be obtained if it is desired that the reed shall respond to a predetermined frequency. Since the frequency response of the reed can be changed by moving the magnet, it follows that the distance to which the magnet has to be moved to cause a given reed to respond to a predetermined frequency becomes a measure of the frequency being indicated, assuming that the change in position of the magnet can be translated onto an indicating dial into fractional units of frequencies. Under such circumstances, the operator need watch only one of the vibrating reeds and to move the permanent magnet to such a position that the reed will vibrate at it maximum amplitude which would give the frequency in unit cycles, and even fractional units can read directly from the dial.

Other objects and features will be apparent as the specification is perused in connection with the accompanying drawings in which.

Figure 3:
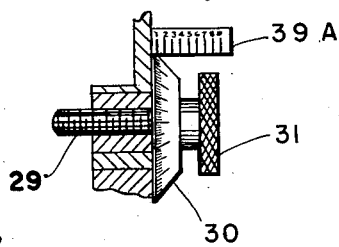
Figure 3 is a fragmentary detailed view of one form of dial indicator used in the meter.

Referring more particularly to Figures 1 to 4, reference numeral 1 designates a cylindrical casing made of insulating material such as a phenolic condensation product, Bakelite, etc., and provided at the top with an overhanging cover portion 2 and open at the bottom. The bottom of the casing is closed by a plate 3, also of insulating material, this plate serving as a support for the internal parts of the instrument as well as carrying the terminal 4. There is a glass window 5 bearing against the underside of the portion 2, this window being held in position by an annular ring 6 of angular cross section. The cover is provided with an opening 7 (Figure 1) which is curved at the ends and bottom, but is flat on the top. The cover also has an inwardly projecting extension 8 which serves as a support for the indicating dials, the latter being adapted to measure the movement given to the magnet in order to effect calibration or to provide a fractional unit reading of the frequencies being measured.

Figure 1:
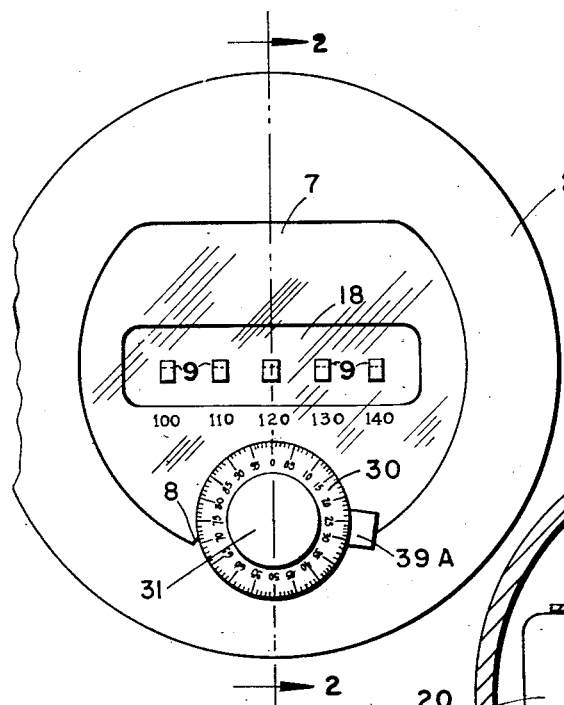
Figure 1 shows a plan view of the improved frequency meter.
Figure 4:
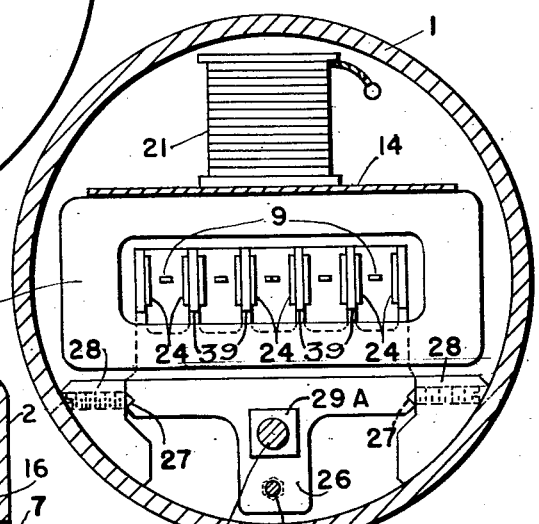
Figure 4 is a plan view of the meter with the cover removed to show the interior parts.

The reeds, of which five have been shown in Figure 1, are supported from a split bar 11, the parts of which are secured together by the clamping screws 12. This bar in turn is supported from a block 13 which is rigidly secured to a bar support 14 extending lengthwise of the casing. One end of the bar 14 is bent upwardly at 15 so as to be screwed to the bottom plate 3. The opposite end of the support 14 is secured in any manner to a relatively thin but stiff plate 16 which extends transversely of the casing 1 to which it may be secured in any suitable and well-known manner. The lower end of the plate 16 abuts the underside of an enlarged portion 17 of the cover 2. The plate member 16 may be provided with a sight opening 18 of rectangular configuration through which the ends of the reeds 9 can be observed. These ends are usually turned downwardly to form flags 19 which are painted white to make them more visible. The reeds 9 are made of a magnetic material such as steel or iron and may or may not be independently magnetized.

In order to vibrate the respective reeds, the usual form of energizing coil 20, also having a rectangular configuration, surrounds the array of reeds, this coil being secured preferably to the bar support 14 in any suitable and well-known manner. A resistance coil 21 may be connected in series with the coil 20 in order to limit the current passing through the coil. A conductor 22 connects one end of the resistance coil 21 with one of the terminals 4 positioned on the outside of the casing. The end of the coil 20 remote from the resistance member 21 is connected through a conductor 23 to the second terminal 4. Thus, when alternating current is applied to the terminal 4, an alternating field is set up about the reeds 9 and one of the reeds will vibrate in tune with the frequency of the current alternation.

In accordance with one of the features of my invention, I provide a mechanism by which the stiffness of response of the reeds, both individually and collectively can be adjusted so that the frequency to which they are basically tuned may be changed readily. This is done by means of a series of small metal plates 24 preferably of Alnico and highly magnetized, these plates being positioned vertically adjacent the edges of each reed on opposite sides thereof. The plates 24 may be riveted or otherwise secured to a relatively large yoke member 25 having a series of U shaped sections and made preferably of a non-magnetic metal such as aluminum. This yoke member is provided with a centrally disposed and downwardly extending leg 26 which is pivoted at each end, as indicated at 27, within the extensions 28 which extend upwardly from the base 3 of the casing. Thus, the yoke as a whole is adapted to swing in the vertical direction about the pivots and in that manner the upper leg or legs of the yoke are adapted to move through a limited distance along the length of the reed line.

In order to effect this adjustment, I provide a hardened metal insert 29a against which a screw threaded member 29 bears, this member being adapted to be rotated from the exterior of the casing. The member 29 is provided with a dial 30 which abuts the upper surface of the cover 2 and to which a knurled knob 31 is secured for rotating purposes. A threaded sleeve 33 engages the thread of the screw 29, this sleeve being tightly driven into an opening provided in the enlarged portion 17 of the cover member. Thus as the knob 31 is rotated, the screw 29 moves either forward or recedes, to cause the yoke member 25 to rotate about its pivots. A tension spring 34 is anchored at 35 to the yoke member, the other end of the spring being attached at 36 to the casing 1 in order to hold the lower end 26 of the yoke against the threaded member 29. The maximum throw or swing of the yoke may be controlled by a threaded member 37 which passes through portion 17 of the cover, this threaded member being adapted to contact an adjustable pin 38 when the yoke has been rotated by the knob 31 through its maximum angle counterclockwise.

It has been explained that the upper portion of the yoke member 25 terminates in a series of upwardly projecting fingers or extensions 39 to which the magnetic tabs 24 are secured. The fingers 39 are separated a distance from one another as readily to clear the reeds 9 and the tabs 24 are positioned on each side of the fingers sufficiently close to the respective vanes 9 as magnetically to affect them. When the knob 31 is rotated so as to swing the yoke 25 about its pivot, the magnetic tabs 24 are caused to move along the vanes 9 to provide a force which restrains them from moving in the vertical direction and the change in position at which this restraining force is applied affects the stiffness of each vane and therefore varies the frequency to which the vane is tuned. Since the tabs 24 are carried by the common yoke member 25 which surrounds all of the flags 19, any change in stiffness of the vane affects all of the vanes alike.

Assume that the reeds basically respond to frequencies of 100, 110, 120, 130 and 140 cycles per second as indicated, and let it further be assumed that the frequency which is being measured is 133.25 cycles. The adjustable knob 31 would be turned until the 130 cycle reed vibrated. The 1—3—0 would then be read directly from the reed, and the 3.25 would be read from the dial 30 which magnetically sets the reed to exact resonance. This means that for a laboratory check instrument, a five reed bank with the adjustment feature described hereinbefore would take the place of a 50 reed instrument. An auxiliary unit index may be provided, if desired, in the form of an outwardly extending bar 39a divided into ten parts as shown in Figure 3. The reading on the bar can be made as the dial 30 moves away from the cover 2, as when the screw 29 is rotated counterclockwise. Still assuming that it is desired to measure a frequency of 133.25 cycles per second, the 130 could be read directly from the reed and the 3 would be read from the bar 39a leaving the .25 to be shown on the dial 30. Thus, extreme accuracy of reading can be obtained by these measuring elements which denote the amount that the yoke 25 has been rotated about its pivot 27 to move the magnetic tab 24 along the vane to cause one of the flags 19 to oscillate in the vertical direction through its maximum distance.

It is obvious that instead of providing magnetic tabs 24 which react on the vane 9 to vary the stiffness of response, I may eliminate the use of these tabs and employ vanes 9 of highly magnetized metal which coact with the yoke 25, which may be made of a magnetic material but not necessarily magnetized. It may also be desirable to magnetize the yoke 25 and to employ vanes which are not fixed magnets but which nevertheless are made of magnetic materials so as to co-operate with the yoke as the latter is swung about its pivots 27.

Figure 2:
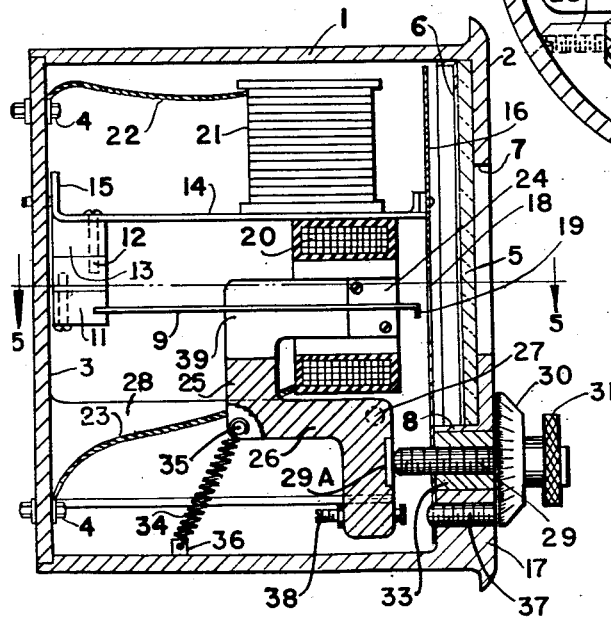
Figure 2 is a vertical sectional view of the meter taken along line 2—2 in Figure 1 looking in the direction of the arrow.
Figure 5:
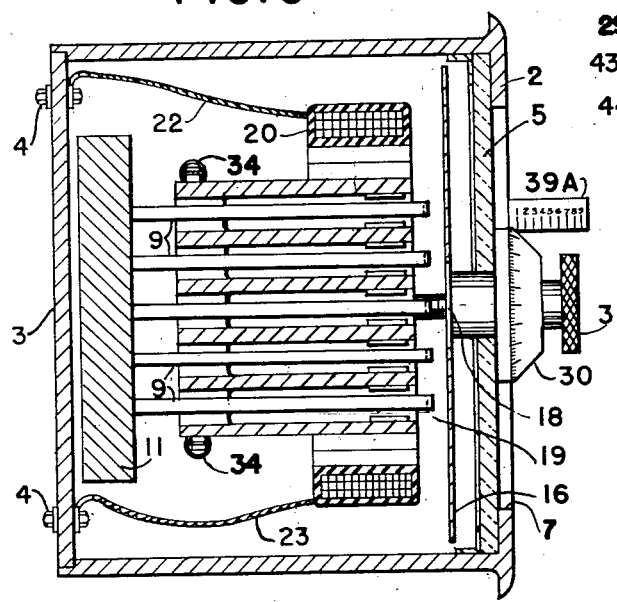
Figure 5 is a sectional view on line 5—5 of Figure 2.
Figure 6:
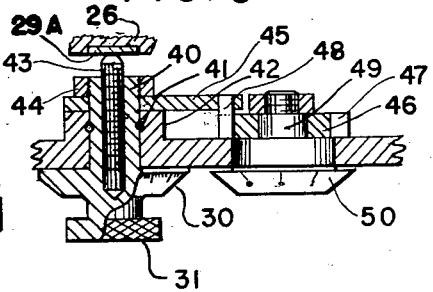
Figure 6 shows a view, partly in section, of a modified form of dial indicator which may be employed in the improved frequency meter.
Figure 7:
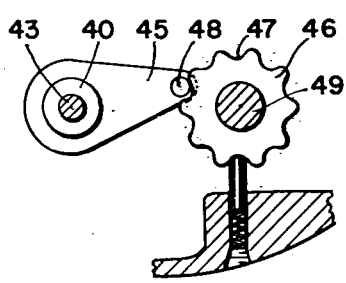
Figure 7 illustrates a fragmentary detail view of the actuator used in the modified form of dial indicator shown in Figure 6.
Figure 8:
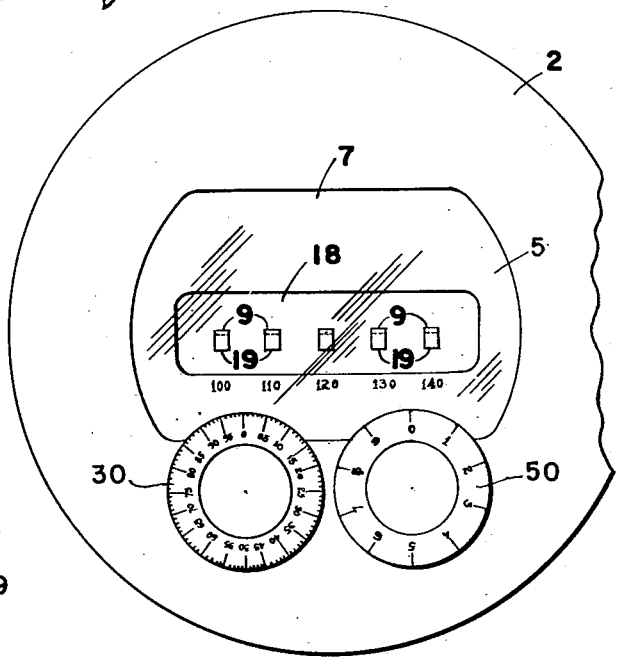
Figure 8 is a plan view of the improved meter using the dial indicator shown in Figures 6 and 7.

In Figures 6, 7 and 8, I have shown a modified form of the frequency indicating mechanism which may take the place of the bar 39a in Figure 2. In the modified arrangement the dial 30 does not move away from the cover 2 and the indications which would normally be read from the bar 39a in Figure 2 are now shown on a separate dial indicator which rotates without moving away from the cover. The dial 30 is provided with a short stub shaft 40 which is prevented from moving in the longitudinal direction by means of a ring key 41 contained within a flange 42 of the cover plate 2. The shaft 40 has a centrally extending bore which is threaded to receive a threaded rod 43, the arrangement being such that as the dial 30 is rotated by the knob 31 the threaded rod 43 is caused to move inwardly or outwardly along the threaded bore of the shaft. The rod 43 is adapted to press against the hardened insert 28 of the yoke member 25 when the dial is rotated, for example, in the clockwise direction, in order to rotate the yoke as was explained in connection with Figure 2. The upper end of the shaft 40, as seen in Figure 6, is threaded to receive a nut 44. There is an arm 45 interposed between the nut 44 and the flange 42, this arm being keyed to the shaft 40 and extending toward an index wheel 46. The latter is provided with a plurality of radially extending slots 47 which are adapted to receive a pin 48 secured to the arm 45. Thus, as the shaft 40 rotates as when the dial 30 is turned, the arm 45 also is rotated through a circular arc and for each complete rotation of the arm, the pin is removed from one of the slots 47 and caused to enter the adjacent slot and thus turn the index wheel 46 through a predetermined angle for each revolution of the dial 30. The wheel 46 is carried on a shaft 49 and bolted at one end, the other end of the shaft terminating in a dial 50.

Still assuming that the frequency to be measured is 133.25 cycles, the 130 is read directly from the reed as before and the 3 can be read from the unit dial 50 while the .25 can be found on the hundredths dial 30. It will be noted that each of the dials 30 and 50 remain during rotation close to the outer surface of the cover 2 and neither one of them is moved away from the cover.

Figure 9:
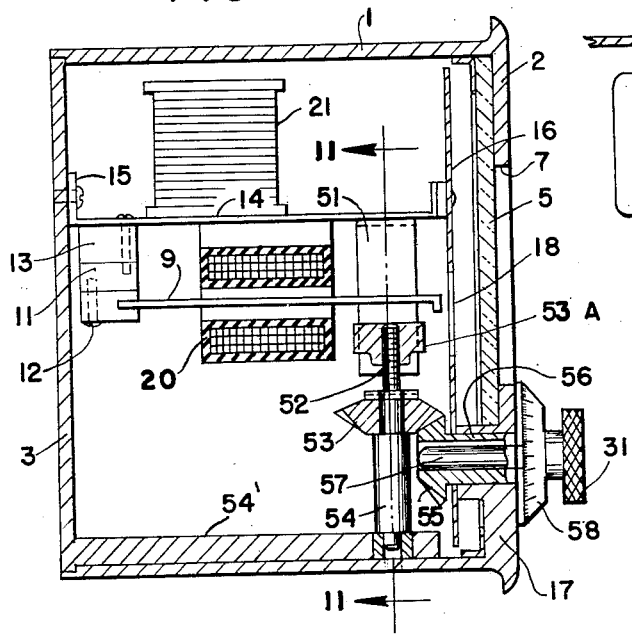
Figure 9 is a sectional view taken through a modified form of meter showing a different way in which the stiffness-adjusting magnet can be moved to provide calibration and to give unit frequency readings on the dial.
Figure 11:
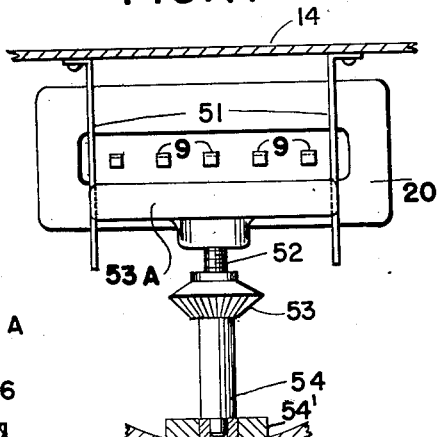
Figure 11 is a sectional view taken along line 11—11 in Figure 9 to show the mechanism by which the movable magnet or magnets are moved with respect to their reeds to change their stiffness.
Figure 10:
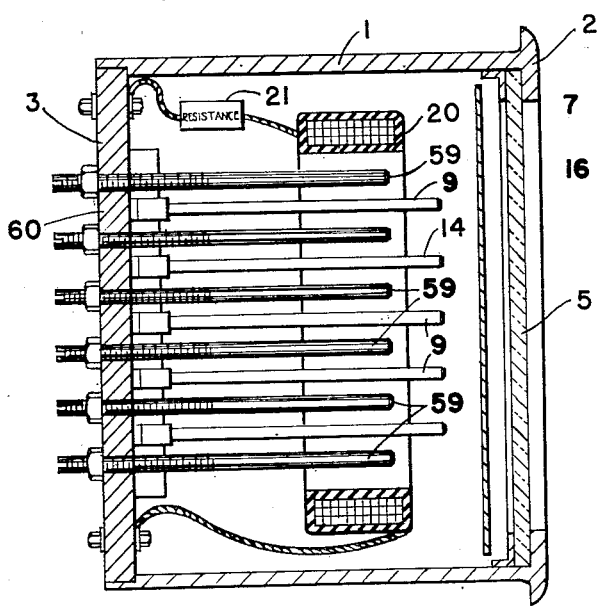
Figure 10 shows still another form of the improved meter, particularly in connection with the manner that the permanent magnets are moved with respect to their adjacent reeds.

In Figures 9, 10, and 11, there is shown still another modified form in which the yoke member 25 is discarded in favor of a magnetic element which moves transversely of the casing. This element is positioned directly under the array of vanes and is contained between a pair of guide members 51 constituted of strips of metal secured in any suitable manner to the bar support 14. In order to move the magnet 53a in a vertical direction a rotating screw 52 is provided, this screw being secured to a bevel pinion 53 carried on the shaft 54. This pinion meshes with a pinion 55 formed on the end of a sleeve 56 which is keyed to a shaft 57. The dial 58 is secured to the shaft and a knurled knob 31 is provided for rotating the dial. As the knob 31 is rotated, the pinions 55 and 53 are caused to rotate, which in turn rotates the screw 52 and thus the magnetic member 50 is caused to move upwardly or downwardly along the guides 51 depending on the direction in which the knob is rotated. As the magnet is moved upwardly, the stiffness ratio imparted to the vanes 9 is increased accordingly, and this in turn changes the frequencies to which that vane or vanes respond. The frequency response of the meter as a whole is therefore varied by the change in position of the magnet member 53a and this change in position can be read directly at the dial 58 in terms of the frequency of the voltage applied to the energizing coil 20. It will be noted that the resistance coil 21 is shown as being supported from the casing rather than from the bar support 14 as in Figure 2. This coil is in series with the coil 20 and has the same purpose as was described in connection with the other figures.

The moving magnet element may, if desired, take the form of a plurality of magnetized rods 59 which are threaded through a non-magnetic plate 60 forming part of the back cover of the casing. These rods terminate in slotted heads which can be turned by a screw driver to cause the rod to move along the length of each vane 14 and thus change the stiffness of the vanes. One of the advantages that the arrangement shown in Figure 10 offers is that an independent magnetic control of the stiffness can be exercised at each vane and each magnetic rod 59 can be used, either for individually calibrating the various vanes or for interpolating the unit frequency to which any one of the vanes responds. Any suitable form of indicator may be employed on each of the rods 59 to determine the amount that it has been necessary to screw the rod 59 in or out of its plate 60 in order either to properly calibrate the instrument or else to have a given reed respond with its maximum amplitude when the energizing coil 20 is connected through the resistor 21 to a source of alternating current. By providing these steel adjustment screws 59 near the flags, it is also possible to eliminate the need of solder gobs by which the reeds are normally tuned as in the conventional type instrument. It will be noted in this figure that the vanes 14 are preferably individually supported from the plate 60 so as to leave a space between the supports for accommodating the magnetic rods 59.

While I have shown in Figures 2 and 9 the use of a permanent magnet or magnets which operate collectively on all of the vanes, it will be understood that if desired, individual magnets may be employed for the respective vanes and individual adjusting mechanisms may be brought out to the exterior of the casing so as to facilitate adjustment of any individual vane. It is also possible to employ a reed or reeds with very low natural frequencies, and to control the magnetic response of the reed or reeds over a still wider span than that mentioned hereinbefore so that all of the stiffness of the reed or reeds would result from the magnet. In this case it would not therefore be necessary to employ carefully selected reeds from the natural resonance standpoint, but to depend entirely on the position of the individual magnet to furnish the discrimination of frequency to which the various reeds would respond.

It will be understood that I desire to comprehend within my invention such modifications as come within the scope of the claims and the invention.

Having thus fully described my invention, what I claim as new and desire to secure by Letters Patent is:

1. A frequency measuring instrument comprising an actuating coil, a reed responsive to the magnetic effect of the coil, and means for changing the stiffness of the reed, said means including a permanent magnet in magnetic association with said reed and said magnet being continuously adjustable in position with respect to the position of the reed.

2. A frequency measuring instrument comprising a bank of reeds tuned basically to different frequencies, and means for changing the basic frequencies to which the respective reeds respond, said means including magnetic members positioned in magnetic relationship with said reeds and means for changing the position of said members collectively with respect to the bank of reeds, said means including a dial positioned on the cover of the measuring instrument which can be rotated to move the magnetic members in position with respect to said reeds.

3. A frequency measuring instrument comprising an actuating coil, a plurality of reeds contained within the coil and responsive to the magnetic effects of the coil, said reeds being constituted of magnetic material and a plurality of magnetic rods positioned on each side of the reeds and adjustable in the direction of the length of the reeds in order to change the stiffness of any one or all of the reeds.

4. A frequency measuring instrument comprising a bank of reeds tuned basically to different frequencies and means for changing the basic frequencies to which the respective reeds respond, said means including a magnetic member extending the longitudinal direction of the total width of the reed bank and adapted to move in a direction transverse of the direction in which the reeds extend and means for translating the movement of said element into unit and fractional units of frequency to which any one or all of the reeds respond.

5. A frequency measuring instrument comprising a casing containing one or more reeds, an actuating coil in magnetic association with said reed which causes the reed to respond when voltage is applied to the coil having a frequency to which the reed is tuned, magnetic means for modifying the resonance frequency of the reed, said means including a permanent magnet adapted to move with respect to the reed and thus change the intensity of the magnetic field surrounding the reed, and a dial positioned outside of the casing, said dial being adapted to move away from the casing in accordance with the movement of the magnetic member within the casing, the movement of said dial being indicated on a graduated bar extending away from the casing.

6. A frequency measuring instrument comprising a casing containing a plurality of reeds tuned basically to different frequencies and means for changing the basic frequencies to which the respective reeds respond, said means including a magnetic member which magnetically influences the reeds and means for moving said member with respect to said reeds in order to change the intensity of the magnetic field imparted to the reeds by the magnetic member, said means including a rotating threaded member on which the magnetic member is mounted and means for rotating said threaded member from the exterior of the casing.

7. A frequency measuring instrument comprising a casing containing a plurality of reeds tuned basically to different frequencies and means for changing the basic frequencies to which the respective reeds respond, said means including a magnetic member which magnetically influences the reeds and means for moving said member with respect to said reeds in order to change the intensity of the magnetic field imparted to the reeds by the magnetic member, said means including a rotating threaded member on which the magnetic member is mounted and means for rotating said threaded member from the exterior of the casing, said last mentioned comprising a pair of dials mounted in the casing, one of said dials having a throw element which causes one of the dials to rotate through a limited angle for a complete revolution of the other dial whereby unit and fractional frequencies are indicated aggregatively by the two dials.

8. A frequency measuring instrument comprising a bank of reeds tuned basically to different frequencies, and means for changing the basic frequencies to which the respective reeds respond, said means including a plurality of permanent magnets positioned in magnetic association with all of said reeds, said magnets being carried on a common yoke member which is pivotally mounted within the instrument, and means including a dial located on the exterior of the instrument for moving the yoke with respect to the instrument and thus vary the position of the permanent magnets with respect to the reeds.

9. In the method of calibrating a frequency measuring instrument including a magnetic reed adapted to vibrate in response to variations of the alternating current energy, said instrument also including a source of magnetism which affects the reed to change its frequency response, the step which comprises moving said magnetism source through varying distances from said reed depending on the amount of calibration changes necessary in order to change the intensity of the magnetic field at the reed while maintaining a constant intensity of magnetism at said source.

10. A frequency measuring instrument comprising an actuating coil, a reed responsive to the magnetic effect of the coil, and means for changing the stiffness of the reed in order to calibrate the instrument, said means including a permanent magnet in magnetic association with said reed, said magnet being continuously adjustable throughout a range of changes which represent maximum and minimum limits of calibration of said instrument.

FREDERICK J. LINGEL.

REFERENCES CITED

The following references are of record in the file of this patent:

UNITED STATES PATENTS

| Number | Name | Date |
|---|---|---|
| 959,934 | Kempf | May 31, 1910 |
| 996,713 | Kempf | July 4, 1911 |
| 1,717,094 | Clokey | June 11, 1929 |
| 1,775,752 | Edwards | Sept. 16, 1930 |